UNITED STATES PATENT OFFICE.

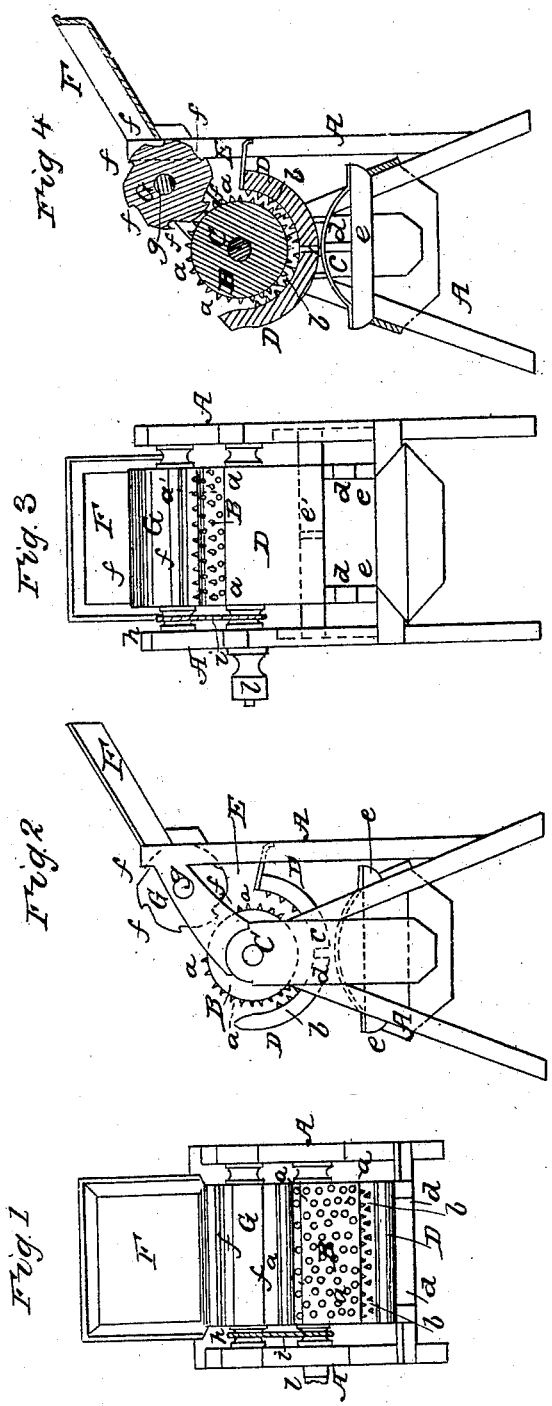

ALMON SWIFT, OF WOLCOTT, VERMONT.

IMPROVEMENT IN CORN-SHELLERS.

Specification forming part of Letters Patent No. 34,912, dated April 8, 1862.

*To all whom it may concern:*

Be it known that I, ALMON SWIFT, of Wolcott, in the county of Lamoille and State of Vermont, have invented an Improved Corn-Sheller; and I do hereby declare the same to be fully described and represented in the following specification and the accompanying drawings, of which—

Figure 1 denotes a top view, Fig. 2 a side elevation, Fig. 3 a front elevation, and Fig. 4 a vertical section, of it.

The nature of my invention consists in an improved rotary ear-arranger as employed in connection with an inclined receiver, a toothed rasping-cylinder, and a toothed concave provided with a discharging-opening.

In the drawings, A represents the frame of the machine, it being suitably constructed for supporting the operative parts to be hereinafter described.

B is the rasping-cylinder, which is fixed on a shaft C, and has its external surface studded with teeth $a\ a\ a$. A hollow concave D extends underneath the lower half of the rasping-cylinder and concentrically therewith, such concave being furnished on its inner surface with teeth $b\ b$, to project therefrom and co-operate with those of the rasping-cylinder Furthermore, the said concave is not only provided with a discharging-orifice $c$, formed through its middle and lower part, but is supported by means of two bow-springs $d\ d$, which rest respectively on rails $e\ e$, arranged within and sustained by the frame A in manner as exhibited in the drawings. A discharging apron or grid E projects from the rear end of the concave D.

Above and in rear of the rasping-cylinder, and so as to stand with its bottom inclined, as shown in Fig. 4, is a receiver or box F, which is open at its inner end, where it is placed against a rotary ear-arranger G. This rotary ear-arranger is placed over the rear end of the concave and between the receiver F and the rasping-cylinder, the respective axes of the said cylinder and arranger being parallel and horizontal. The said arranger consists of a fluted cylinder, whose flutes $f\ f\ f$ are disposed at suitable distances apart within the outer surface of the arranger, and are formed as shown by the drawings.

The journals of the shaft $g$ of the arranger are supported by the frame A, the said shaft having a pulley or grooved roller $h$ fixed to it. Around the said pulley and another similar one—viz., $i$, affixed on the shaft of the rasping-cylinder—an endless belt $k$ extends.

When ears of corn are in the inclined receiver, the inclination of its bottom will cause them to be pressed against the arranger, which, when the rasping-cylinder is revolved by power applied to a crank $l$, will be put in revolution and will raise more or less of the ears out of the receiver and discharge them upon the rasping-cylinder. The office of the arranger is to properly dispose or arrange the ears for the action of the rasping-cylinder and its concave, the arrangement being such as to cause each ear to be discharged sidewise upon the rasping-cylinder instead of endwise.

If an ear of corn is pressed endwise between the rasping-cylinder and the concave, the cob of such ear is liable to be broken up and ground before it is discharged from between the cylinder and concave; but when the ear is introduced sidewise between the cylinder and concave they will remove its kernels and discharge them through the orifice of the concave, the cob being thrown out upon the discharging-apron. Besides performing the function of arranging the ear as described, the rotary ear-arranger, while in revolution, so acts on the mass of ears within the receiver as to shake and disturb them on its inclined bottom, the inclination of which causes gravity to operate with the arranger in a manner which advantageously effects the arrangement of each of the ears, so as to cause it to be presented sidewise to and be seized by the arranger.

The space between each two of the flutes $f$ $f$ is a portion of the cylindric surface of the arranger G, and performs an important function with the chute E, as after an ear of corn has been taken out of the trough F by one of the flutes the cylindrical surface or space between it and the next advancing flute acts not only as a stop for the next descending ear to abut against, but it will roll such ear more or less and prepare it or bring it into a proper position to fall into the next flute. When the flutes are close together and without the cylindrical spaces between them, they are apt to pass by an ear without catching it, and often strike it, so as to break off more or less of the kernels of corn. Therefore I do not claim the combination of the receiver F, the rotary ear-arranger G, the rasping-cylinder B, and its concave D; but

What I claim as my invention or improvement is—

The combination of the peculiarly-constructed cylinder G, having not only a series of flutes $f\,f$, but a surface between each two of them, with the inclined receiver F, the rasping-cylinder B and its concave D, constructed and operating as and for the purpose specified.

ALMON SWIFT.

Witnesses:
 THOMAS GLED,
 PHILIP K. GLED.